United States Patent
Shinozaki et al.

(10) Patent No.: US 6,367,285 B1
(45) Date of Patent: Apr. 9, 2002

(54) FREEZE-CONCENTRATING APPARATUS FOR AQUEOUS SOLUTIONS, ICE PILLAR PRODUCING APPARATUS, AND FREEZE-CONCENTRATING METHOD FOR AQUEOUS SOLUTIONS

(75) Inventors: Katsuhiko Shinozaki, Osaka; Hisatoyo Yazawa, Nara; Yutaka Yamazaki; Kiyoshi Tenmaru, both of Osaka; Yoshio Sugita, Yamanashi; Hitoshi Hasegawa, Yamanashi; Eiji Sekiya, Yamanashi; Akimasa Nakagomi, Yamanashi; Heihachi Matsunaga, Yamanashi; Yoshihiko Katsuyama, Tokyo, all of (JP)

(73) Assignee: Fujisawa Pharmaceutical Co., Ltd., Osaka (JP)

( * ) Notice: Subject to any disclaimer, the term of this patent is extended or adjusted under 35 U.S.C. 154(b) by 0 days.

(21) Appl. No.: 09/445,449

(22) PCT Filed: Jun. 9, 1998

(86) PCT No.: PCT/JP98/02551

§ 371 Date: Dec. 13, 1999

§ 102(e) Date: Dec. 13, 1999

(87) PCT Pub. No.: WO98/56480

PCT Pub. Date: Dec. 17, 1998

(30) Foreign Application Priority Data

Jun. 13, 1997 (JP) .............................. 9-157044

(51) Int. Cl.$^7$ .................................................. B01D 9/04
(52) U.S. Cl. ...................................................... 62/535
(58) Field of Search .......................... 62/532, 535, 541, 62/543

(56) References Cited

U.S. PATENT DOCUMENTS

| 3,292,386 | A | * | 12/1966 | Johnson et al. | ................ 62/123 |
| 3,992,170 | A | | 11/1976 | Karnofsky | |
| 4,099,947 | A | | 7/1978 | Ganiaris | |
| 4,314,455 | A | * | 2/1982 | Engdahl | ....................... 62/124 |
| 5,035,733 | A | * | 7/1991 | Goldstein | ..................... 62/541 |
| 5,816,057 | A | * | 10/1998 | Dickey et al. | ................ 62/123 |

FOREIGN PATENT DOCUMENTS

EP          0360876          4/1990

* cited by examiner

Primary Examiner—Henry Bennett
Assistant Examiner—Malik N. Drake
(74) Attorney, Agent, or Firm—Eric J. Robinson; Nixon Peabody LLP

(57) ABSTRACT

In a freeze-concentrating apparatus, an aqueous solution is cooled by a cooling cylinder 22 serving as a heat exchanger for cooling to continuously produce a suspension containing ice crystals. A liquid component is separated and discharged from the suspension to increase the ratio of the ice crystals, and the ice crystals are grown to produce a column-shaped ice cake. The ice cake is cut into an ice pillar of a given length and a concentrated solution is taken out from the ice pillar.

10 Claims, 8 Drawing Sheets

FREEZE-CONCENTRATING APPARATUS FOR AQUEOUS SOLUTIONS, ICE PILLAR PRODUCING APPARATUS, AND FREEZE-CONCENTRATING METHOD FOR AQUEOUS SOLUTIONS

TECHNICAL FIELD

This invention relates to a freeze-concentrating apparatus for an aqueous solution, an ice pillar producing apparatus and a freeze-concentrating method for an aqueous solution, which are particularly used for concentration of an aqueous solution such as beverage, alcohol, a medicament and for disposal for turning industrial waste water or seawater into fresh water.

BACKGROUND ART

In general, a freeze-concentrating method is a method of concentrating an aqueous solution by cooling a target aqueous solution, freezing water within the aqueous solution to obtain an ice, extracting the ice by solid-liquid separation. Accordingly, the method is suitable for concentrating an aqueous solution of which solute is liable to be degraded and a beverage of which aroma is liable to fade under a high temperature.

Also, the extracted ice in the above freeze-concentrating method can be utilized as a regenerative material, and the method can be applied to a case for turning seawater into fresh water.

Problems to be Solved

In the above freeze-concentrating method, continuous operation is required for industrial utilization. However, enablement of the continuous operation in a conventional freeze-concentrating apparatus requires freezing operation and the like, which increases the size of the apparatus itself and requires considerable facility investment.

Further, in case where a target liquid is different in kind of solute or concentration, it is difficult for the conventional freeze-concentrating apparatus to perform adjustment according to the target liquid.

On the other hand, in the above freeze-concentrating method, extraction of ice crystals under a state that a solution adheres to the surface of the ice crystals decreases the concentration efficiency. For this reason, less surface area (specific surface) of the ice crystals is preferable. To reduce the specific surface of the ice crystals, it is needed to obtain spherical ice crystals having large diameters.

Accordingly, in the above freeze-concentrating method, it is required for the continuous operation to convey the ice crystals in a state of fluid, namely, to convey a suspension containing the ice crystals in a state of slurry. Further, there is another problem how to make spherical ice crystals having large diameters in the suspension.

In so doing, as ice producing means for producing a suspension containing an ice to be used for freeze concentration, it is general to produce an ice by condensing water on the surface of a cooled drum or the inner surface of a cylinder, then scraping the thus produced ice.

However, ice crystals obtained by this ice producing means are flaky. For this reason, a maturing tank is separately used as means for producing and growing the ice crystals, and the ice crystal is stirred under a given temperature condition to grow the ice crystals to be spherical and large. Therefore, the treated aqueous solution of which amount corresponds to the capacity and residence time of the maturing tank is always required in addition to a required amount thereof for the ice production. As a result, the apparatus is large sized.

Moreover, for the above ice producing means, there is a method of producing an ice in quasi-criticality by excessive cooling, which is used for regenerating cooling/heating energy and the like for air conditioning. According to this ice producing means, a suspension containing ice crystals in nearly spherical shape can be obtained. However, the ice crystals obtained by this ice producing means have extremely small grain diameters, which means difficultly in solid-liquid separation. Since there is no conventional method for effectively growing the ice crystals, this ice producing means has not been applied to the freeze-concentrating method.

The present invention has been made in view to the above problems and its conception is that even flaky ice crystal or spherical but small ice crystal can be used for freeze-concentration regardless of an ice producing method if the ice crystals can be accumulated in a short period of time without using a special maturing tank and can be grown in the spherical shape. Accordingly, the object of the present invention is to grow ice crystals to be large and spherical in a suspension, while reducing the entire size of an apparatus.

DISCLOSURE OF INVENTION

Summary of the Invention

The inventors of the present invention have found that spherical ice crystals having large grain diameters can be obtained in such a manner that a suspension containing ice crystals is produced by cooling an aqueous solution, a liquid component is separated and discharged from the suspension to increase the ratio of the ice crystals in the suspension, and the ice crystals are grown to produce an ice pillar. The inventors have further found that a concentrated solution can be obtained in such a manner that, for example, the thus obtained ice pillar is inserted in a column filter, cold water is injected into one end of the column filter to push out a concentrated solution in the ice crystals of the ice pillar from the other end of the column filter. In consequence, the present invention has been achieved.

Means of Solving the Problems

In detail, first solving means is directed to a freeze-concentrating apparatus for an aqueous solution. This solving means comprises ice producing means, having a heat exchanger for cooling, for continuously producing a suspension containing ice crystals by cooling an aqueous solution by the heat exchanger for cooling. Further, it comprises ice pillar producing means, to which the suspension produced by the ice producing means is supplied, for separating and discharging a liquid component from the suspension to increase the ratio of the ice crystals and for producing a column-shaped ice cake by growing the ice crystals. In addition, there is provided separating means for taking out a concentrated solution from the ice pillar produced by the ice pillar producing means.

A second solving means comprises, in the first solving means, ice pillar cutting/conveying means for cutting the ice cake produced by the ice pillar producing means into an ice pillar of a given length and for conveying the ice pillar to the separating means.

In third solving means, the ice producing means in the first or second solving means includes a stirring mechanism for stirring the aqueous solution flowing to a cooling cylinder serving as the heat exchanger for cooling or a scraping blade mechanism for scraping an ice generated on the surface of a cooling cylinder serving as the heat exchanger for cooling.

In fourth solving means, the ice pillar producing means in any one of the first through to third solving means includes a producing cylinder to which the suspension is supplied, and a filter, attached to a part of the side wall of the producing cylinder, for separating and discharging the liquid component from the suspension. In addition, the producing cylinder has at the inside thereof an accumulating chamber for producing a column-shaped ice cake by accumulating the suspension, fusing the ice crystals in the suspension by at least one of pressure application and the weight of itself, and growing the ice crystals.

In fifth solving means, the producing cylinder in the fourth solving means includes a rectification plate, in which a plurality of holes is formed, for rectifying the suspension. Further, the accumulating chamber is divided into an upper chamber and a lower chamber by the rectification plate. In addition, an outer cylinder is provided outside of the producing cylinder for receiving the liquid component discharged from the producing cylinder.

In sixth solving means, the separating means in any one of the first through to fifth means includes a column filter to which the ice pillar is inserted, and a cold water injecting mechanism, having a head part adhered to and caught by the column filter, for substituting the concentrated solution in the ice pillar for cold water by injecting cold water into the column filter through the head part to take out the concentrated solution.

In seventh solving means, the separating means in any one of the first through to fifth solving means includes a column filter to which the ice pillar is inserted, and a vacuum pump, connected with the lower part of the column filter, for taking out the concentrated solution in the ice pillar by applying a negative pressure to the column filter.

In eight solving means, the separating means in any one of the first through to fifth solving means includes a centrifuge, having a rotary cylinder for crushing adequately and accommodating the ice cake produced by the ice pillar producing means, for centrifugally separating to take out the concentrated solution in the ice cake by rotating the rotary cylinder.

Ninth solving means is directed to an ice pillar producing apparatus. This solving means comprises a producing cylinder to which a suspension containing ice crystals is supplied. Further comprised is a filter, attached to a part of the side wall of the producing cylinder, for separating and discharging a liquid component from the suspension. In addition, the producing cylinder includes at the inside thereof an accumulation chamber for producing a column-shaped ice cake by accumulating the suspension, fusing the ice crystals in the suspension by at least one of pressure application and the weight of itself, and growing the ice crystals.

Also, in tenth solving means, the producing cylinder in the ninth solving means includes a rectification plate, in which a plurality of holes are formed, for rectifying the suspension. Further, the accumulation chamber is divided into an upper chamber and a lower chamber by the rectification plate. In addition, an outer cylinder is provided outside the producing cylinder for receiving the liquid component discharged from the producing cylinder.

Further, eleventh solving means is directed to a method of freeze-concentrating an aqueous solution. In this solving means, an aqueous solution is cooled first by a heat exchanger for cooling of ice producing means, and a suspension containing ice crystals is continuously produced. Then, the suspension produced by the ice producing means is supplied to the ice pillar producing means to produce a column-shaped ice cake by separating and discharging a liquid component from the suspension to increase the ratio of the ice crystals, and growing the ice crystals.

Subsequently, the ice cake produced by the ice pillar producing means is cut into an ice pillar of a given length and is conveyed and inserted to a column filter of separating means by ice pillar cutting/conveying means. Thereafter, cold water is injected or infused into the separating means to take out the concentrated solution in the ice crystals in the ice pillar.

Operation

According to the above-prescribed limitations in the invention, the cooling cylinder serving as the heat exchanger for cooling is cooled by driving the ice producing means and the aqueous solution is supplied to the ice producing means. In the cooling cylinder, the aqueous solution is stirred by, for example, a stirring member to become the suspension containing the ice crystals, then is flown into the ice pillar producing means.

The suspension is flown into the producing cylinder of the ice pillar producing means to be stirred by the flow thereof. For example, the suspension flows through the holes of the rectification plate, so that the ice crystals are more evenly dispersed. Then, the ice crystals float up in the suspension.

Since the liquid component is discharged from the suspension in the producing cylinder, the ice crystals are deposited and are compressed by receiving the weights of the suspension and the ice cake, thereby the ice crystals are fused and grown. As a result, the ice crystals which are solidified to be the ice cake are pushed upward.

Thereafter, the ice cake is, for example, cut into the ice pillar of the given length then is conveyed to the column filter of the separating means by the ice cutting/conveying means. In the separating means, for example, the cold water is injected into the column filter to substitute the concentrated solution in the ice pillar for the cold water, so as to be discharged out from the column filter.

The concentrated solution may be utilized directly or condensed again, and the ice pillar after the substitution is reused as a thermal source for cooling, and the like.

Effects

According to the present invention, the suspension produced by the ice producing means contains the ice crystals of a high ratio, the ice crystals are grown to produce the column-shaped ice cake, and the concentrated solution is taken out from the ice pillar of the given length into which the ice cake is cut, thereby achieving continuous drive of freeze concentration. Additionally, size reduction of the device itself and cost reduction for facility investment can be contemplated.

Also, even if a target liquid is different in kind of solute or concentration, adequate adjustment can be easily performed in accordance with the liquid.

Since the ice crystals in the suspension produced by the ice producing means can be made large and spherical by the ice pillar producing means, the ice crystals, which are produced regardless of an ice producing method, can be used for freeze concentration. This attains great enhancement of concentration efficiency.

Consequently, the present invention is useful in concentration of fruit juice, grape juice, and the like, for concentration of pharmaceutical material, for turning seawater into fresh water for shipping and for remote islands, and for disposal of industrial waste water.

In addition, according to the ninth and tenth solving means, the thus produced ice pillar may be used as food in a sherbet state with the use of wine. Especially, food having novel taste such as a stuffing in a dumpling is obtained, instead of frosty food such as conventional food in a sherbet state.

BEST MODE FOR CARRYING OUT THE INVENTION

The embodiment of the present invention is described below in detail, based on accompanying drawings.

Figure 1:
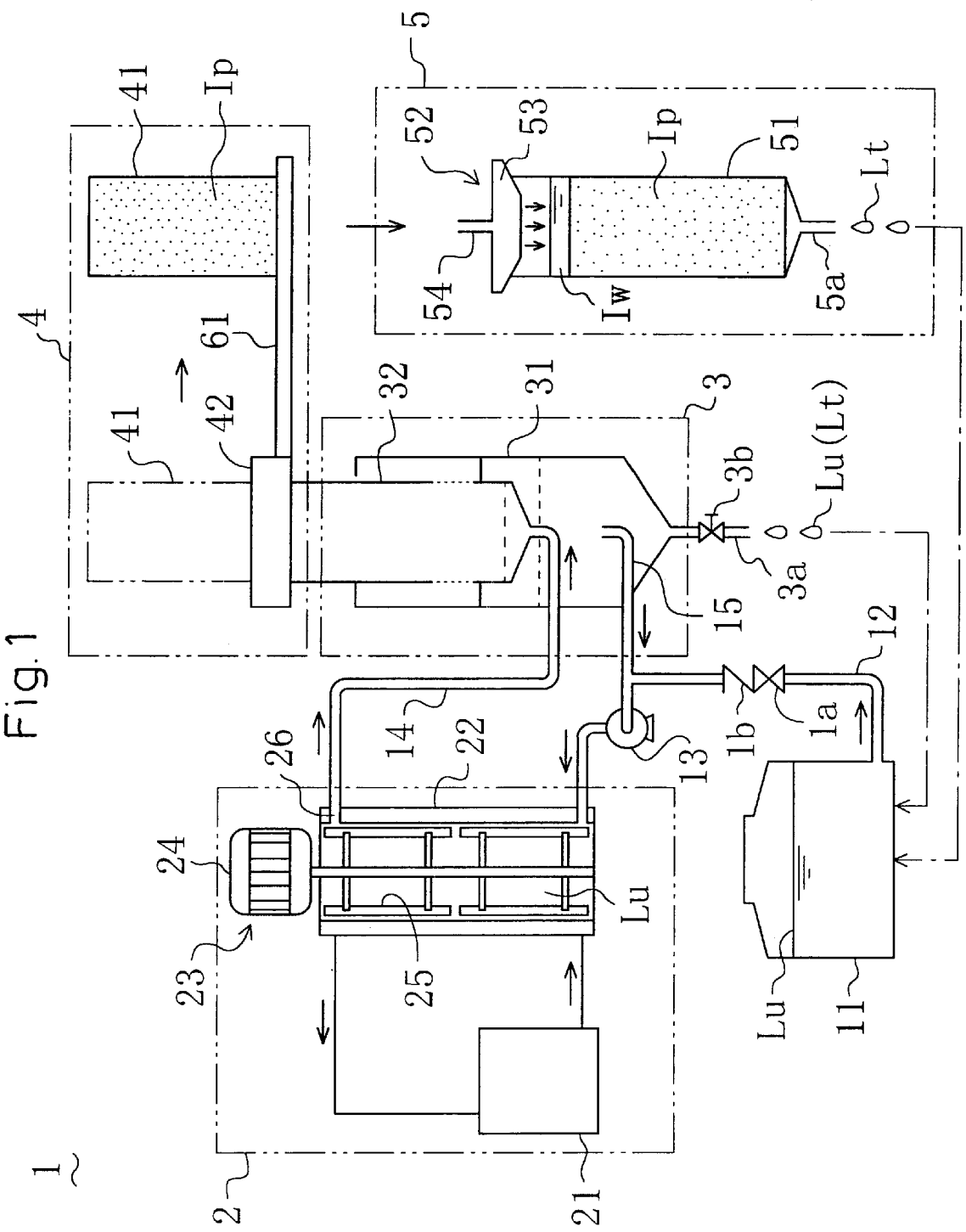
FIG. 1 is a schematic view showing a construction of a freeze-concentrating apparatus.
Figure 2:
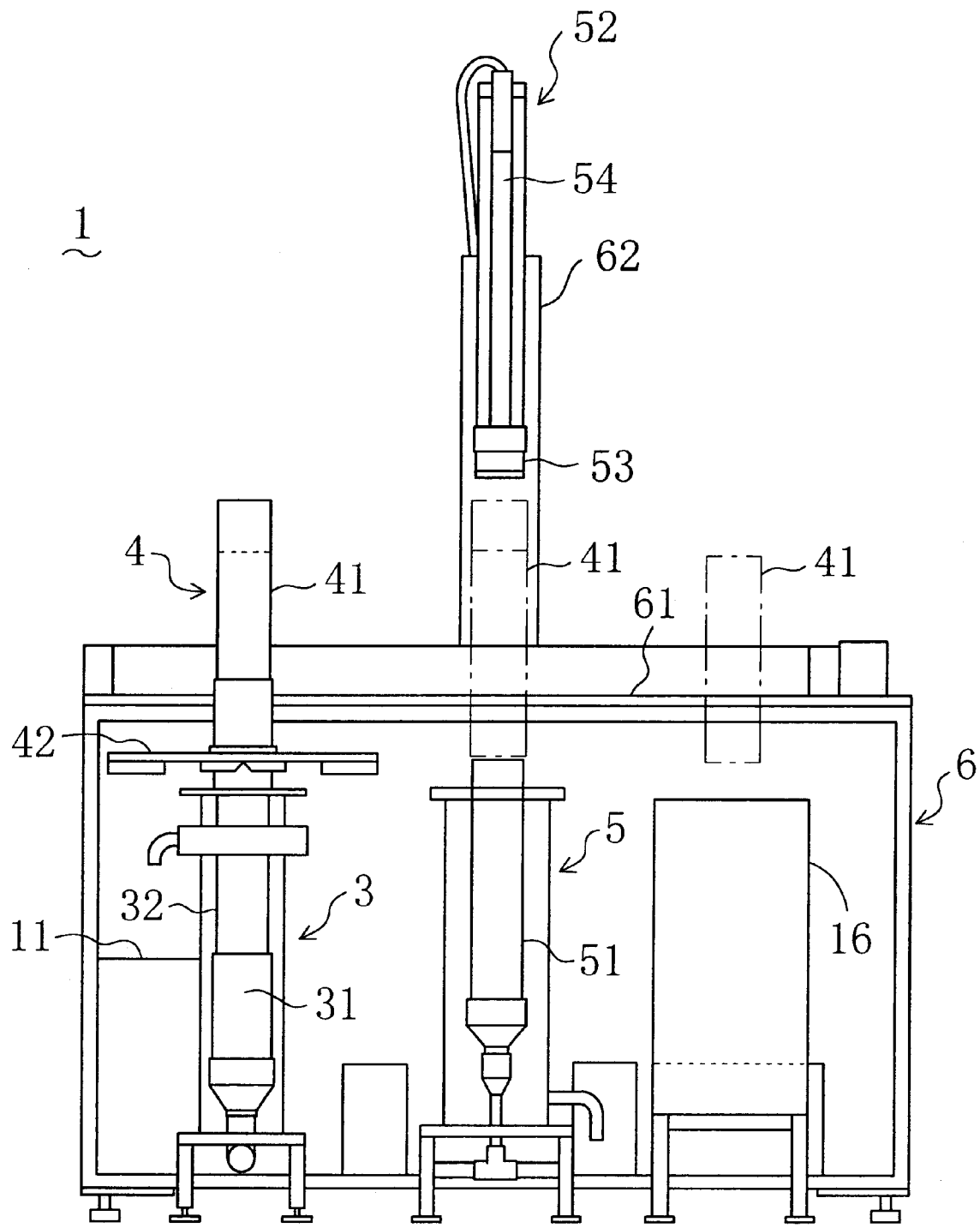
FIG. 2 is a front view showing the freeze-concentrating apparatus.
Figure 3:
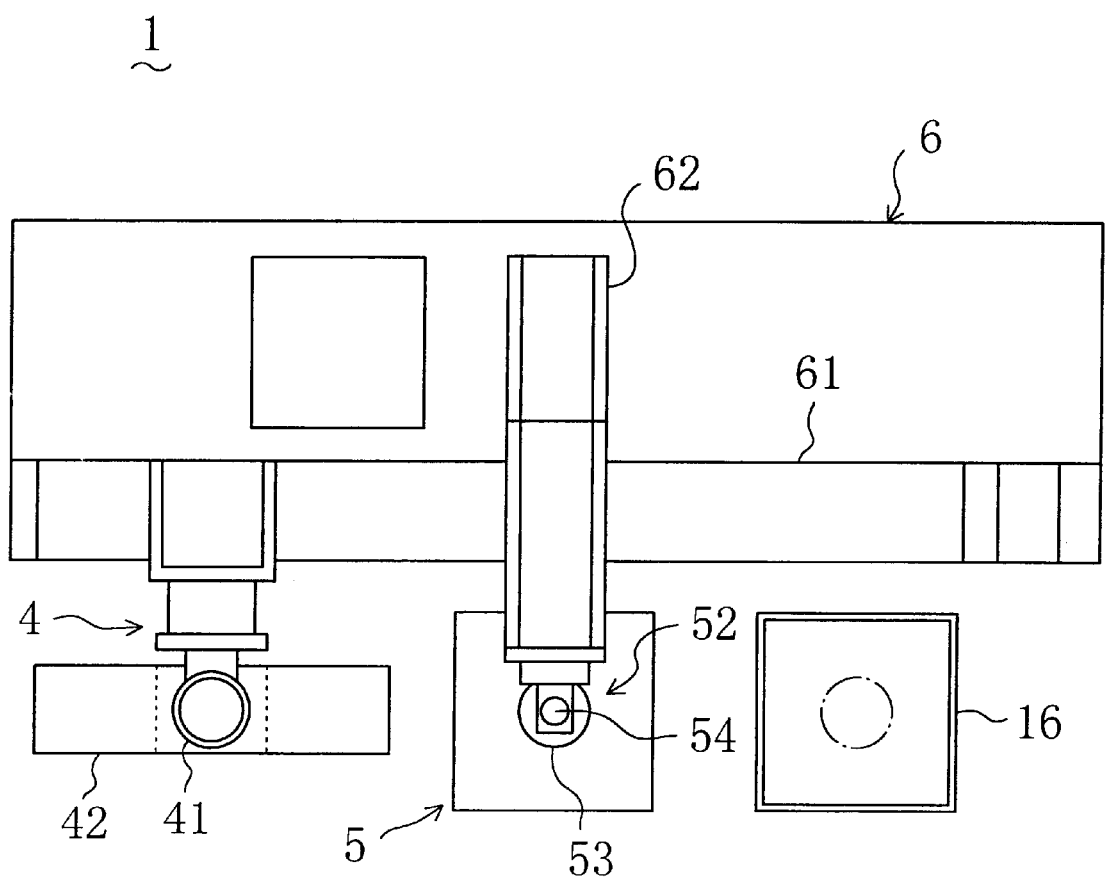
FIG. 3 is a plan view showing the freeze-concentrating apparatus.

FIG. 1 schematically shows a freeze-concentrating apparatus 1 in the present invention, FIG. 2 is a front view of the freeze-concentrating apparatus 1, and FIG. 3 is a plan view of the freeze-concentrating apparatus 1.

The above freeze-concentrating apparatus 1 includes ice producing means 2 for producing a suspension Ls containing ice crystals Cp, ice pillar producing means 3 for producing an ice pillar Ip, ice pillar cutting/conveying means 4 for conveying the ice pillar Ip, and separating means 5 for taking out a concentrated solution Lt from the ice pillar Ip.

The above ice producing means 2 is of night regeneration type in an air conditioner and is composed of a vapor-compression type refrigeration cycle. The ice producing means 2 is so composed that a cooling cylinder 22 is connected with a thermal source unit 21 having a compressor, a condenser and an expansion mechanism. Further, a coolant is circulated from the thermal source unit 21 to the inside of the sidewall of the cooling cylinder 22, then is evaporated inside the sidewall of the cooling cylinder 22. In short, the cooling cylinder 22 composes a heat exchanger for cooling.

With the above cooling cylinder 22, a material tank 11 is connected through a conveying pipe 12 and ice pillar producing means 3 is connected through another conveying pipe 14. A stirring mechanism 23 is provided to the cooling cylinder 22. The material tank 11 reserves an aqueous solution Lu which is supplied to the cooling cylinder 22 by means of a circulating pump 13. Wherein, the conveying pipe 12 is provided with a shut-off valve 1a and a check valve 1b.

The stirring mechanism 23 is composed of a motor 24 and a stirring member 25 connected therewith. The stirring mechanism 23 is so composed to stir the aqueous solution Lu flowing to the cooling cylinder 22. The aqueous solution Lu flowing to the cooling cylinder 22 is cooled by evaporation of the coolant and cooled by being stirring by the stirring member 25 to be in an excessively cooled state. The aqueous solution Lu in the excessively cooled state flows into the ice pillar producing means 3 from the cooling cylinder 22 through the conveying pipe 14. At this time, when the aqueous solution Lu flows out into the conveying pipe 14 from an upper outlet 26, an equilibrium state of the excessively cooled aqueous solution Lu is broken by an impact energy or the like. Then, ice cores of the ice crystals Cp are generated in the aqueous solution Lu, so that the aqueous solution Lu becomes a suspension Ls containing the ice crystals Cp. The suspension Ls is conveyed to the ice pillar producing means 3 through the conveying pipe 14.

Figure 4:
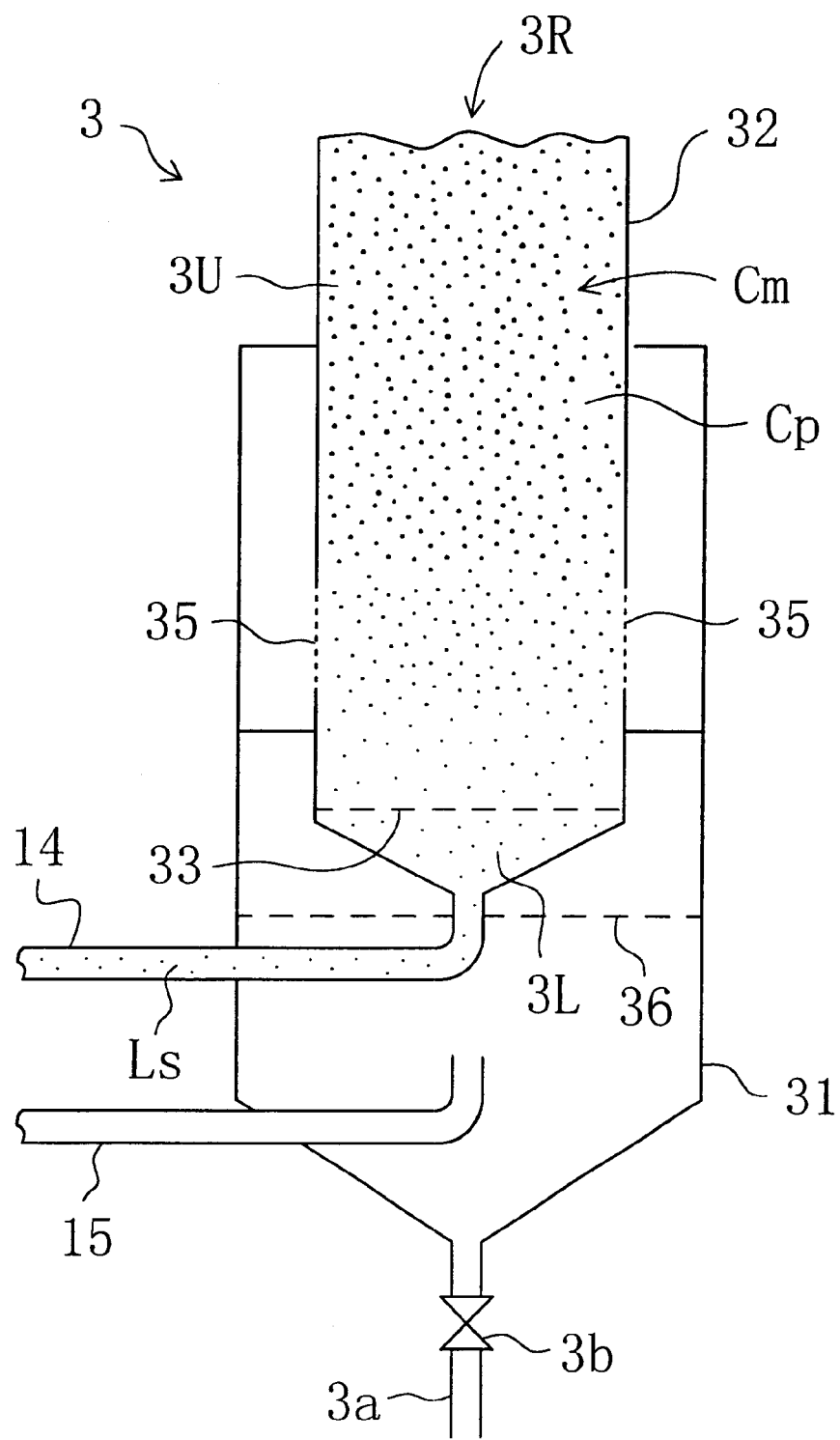
FIG. 4 is an enlarged diagram showing ice pillar producing means.

The ice pillar producing means 3 is, as shown in FIG. 4, formed in a double-pipe structure in which an inner cylinder 32 serving as a producing cylinder is inserted in an outer cylinder 31. Each of the outer cylinder 31 and the inner cylinder 32 is formed in the shape of a funnel at the lower parts thereof and opened at the upper parts thereof.

Figure 5:
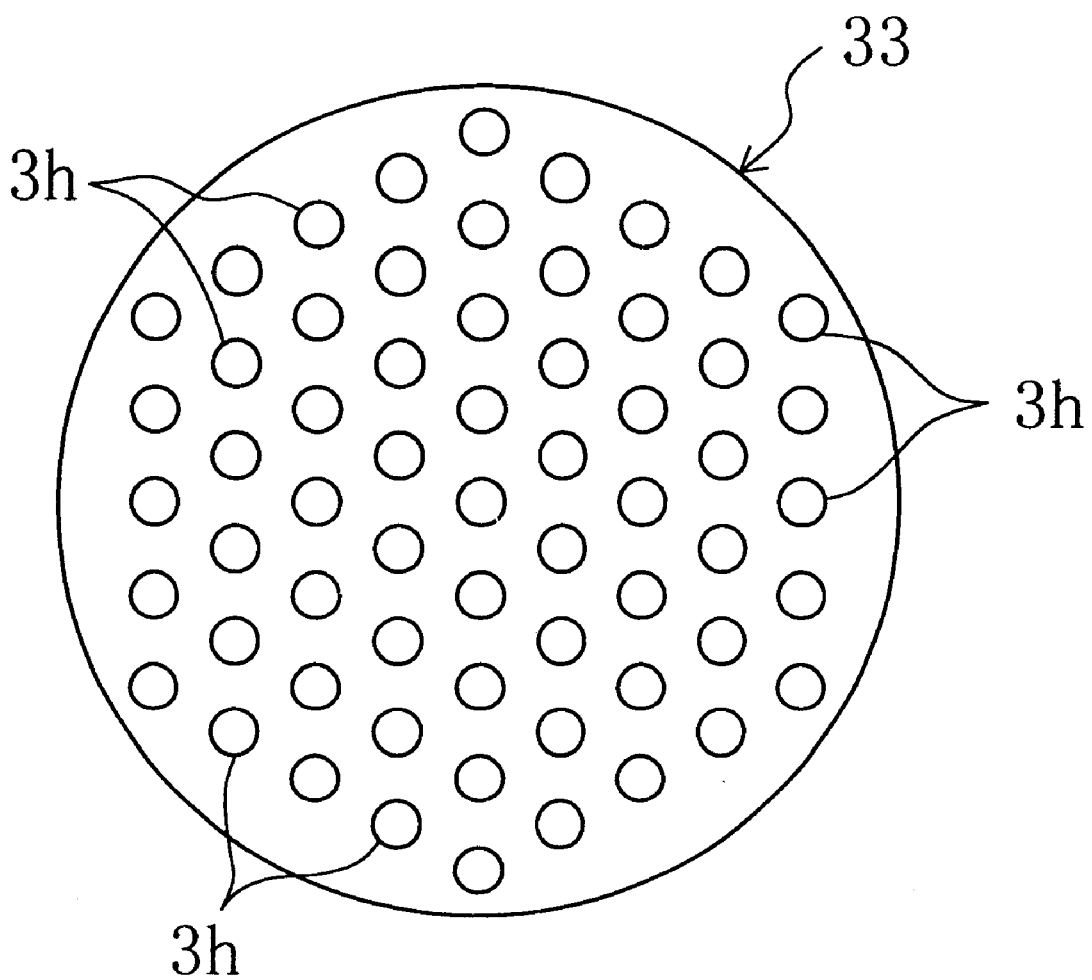
FIG. 5 is an enlarged plan view showing a rectification plate.

The inner cylinder 32 is connected at the lower end part thereof with the conveying pipe 14 so as to communicate with the cooling cylinder 22 of the ice producing means 2, and the inside of the inner cylinder 32 composes an accumulation chamber 3R. A rectification plate 33 is provided at the lower part of the inner cylinder 32 to divide the accumulation chamber 3R into an upper accumulation chamber 3U and a lower accumulation chamber 3L. The rectification plate 33 is, as shown in FIG. 5, composed of a punched plate in which a plurality of holes 3h having, for example, diameters of 5 to 10 mm are formed. The rectification plate 33 rectifies the flow of the suspension Ls so as to evenly disperse the ice crystals Cp in the suspension Ls flowing into the upper accumulation chamber 3U from the lower accumulation chamber 3L.

In the inner cylinder 32, a filter 35 is formed at slightly above the rectification plate 33. The filter 35 is so composed to separate and discharge a liquid component from the suspension Ls.

The inner cylinder 32 accumulates the suspension Ls and fuses the ice crystals Cp by separating and discharging the liquid component of the suspension Ls by the weight of itself. At the same time, the inner cylinder 32 produces a column-shaped ice cake Cm by growing the ice crystals Cp. In detail, the suspension Ls containing the ice crystals Cp flows into the lower accumulation chamber 3L. Then, the suspension Ls is stirred by the flow thereof in the lower accumulation chamber 3L, thereby the ice crystals Cp are dispersed almost evenly. Further, the suspension Ls flows through the holes 3h of the rectification plate 33 so that the ice crystals Cp are further dispersed. The suspension Ls then flows into the upper accumulation chamber 3U, and the ice crystals Cp float up.

When the suspension Ls flows into the upper accumulation chamber 3U, the ice crystals Cp are deposited in the upper accumulation chamber 3U. The ice crystals Cp receive the pressure of the suspension Ls and the weight of the ice cake Cm thereabove, and an excessive solution as the liquid component is dispersed from the filter 35. Then, the ice crystals Cp are compacted and fused to be grown. As a result, solidified ice cake Cm is produced and pushed upward. Wherein, an upper limit of the height of the grown ice cake Cm depends on a discharge pressure of the circulating pump 13 for circulating the suspension Ls.

The outer cylinder 31 has a slightly larger diameter than that of the inner cylinder 32. The outer cylinder 31 includes at the lower part thereof a filter 36 for separating the ice crystals Cp and is connected with a return pipe 15 and a discharge pipe 3a. The outer cylinder 31 is composed so as to receive the liquid component separated and discharged from the suspension Ls in the inner cylinder 32. The return pipe 15 is connected with the conveying pipe 12 between the raw liquid tank 11 and the cooling cylinder 22. Further, the liquid component in the suspension Ls flowing out to the outer cylinder 31 is returned as the aqueous solution Lu to the thermal source unit 21 by the circulating pump 13. Moisture remaining in the aqueous solution Lu is cooled again together with the aqueous solution Lu from the material tank 11, thereby being changed to ice crystals Cp.

Wherein, the discharge pipe 3a is provided with a shut-off valve 3b so as to discharge outside of the apparatus the liquid component in the suspension Ls flowing out to the outer cylinder 31. This liquid component may be used as a concentrated solution Lt of a given concentration or may be returned to the material tank 11 for re-concentration.

Also, since the aqueous solution Lu (raw solution) is supplemented to the material tank 11, the freeze-concentration can be continuously operated.

The ice pillar cutting/conveying means 4 cuts the ice cake Cm produced by the ice pillar producing means 3 into the ice pillar Ip of a given length and conveys it to the separating means 5. The ice pillar cutting/conveying means 4 is, as shown in FIGS. 2 and 3, placed on a slide table 61 provided at a base table 6 and is provided with a conveying cylinder 41 and a cutter 42. The conveying cylinder 41 is reciprocally moveable between the ice pillar producing means 3 and a point above the separating means 5, and has an inner diameter almost equal to that of the inner cylinder 32 of the ice pillar producing means 3. In association with the production by the ice pillar producing means 3, the ice cake Cm produced is introduced into the conveying cylinder 41 at a point continued to the inner cylinder 32.

The cutter 42 is provided at the lower part of the conveying cylinder 41. The cutter 42 cuts the ice pillar Ip introduced to the conveying cylinder 41 when the ice pillar Ip grows, for example, to be about 40 cm in length. The ice pillar cutting/conveying means 4 conveys the ice pillar Ip to the separating means 5 under a state where the cutter 42 closes a lower end opening of the conveying cylinder 41.

The separating means 5 includes a cylindrical column filter 51 adjacent to the ice pillar producing means 3. The inner diameter of the column filter 51 is almost equal to that of the conveying cylinder 41 of the ice pillar cutting/conveying means 4. In the other words, the column filter 51 has an almost equal diameter to that of the inner cylinder 32 of the ice pillar producing means 3, is formed in the shape of a funnel at the lower part thereof, and is connected at the lower part thereof with a discharge pipe 5a.

The separating means 5 includes a cold water injecting mechanism 52. The cold water injecting mechanism 52 is mounted to a supporting pole 62 provided at the base table 6, is movable upwardly and downwardly, and is provided with a head part 53 and an infusing pipe 54 for cold water. The head part 53 is adhered to and caught by an upper opening of the column filter 51. On the other hand, the infusing pipe 54 is connected to a cold water tank or the like (not shown). The infusing pipe 54 injects cold water Iw through the head part 53 to the column filter 51 in order to take out the concentrated solution Lt by substituting the concentrated solution Lt in the ice pillar Ip for cold water.

In other words, in the separating means 5, the upper part of the column filter 51 is sealed by the head part 53 after the ice pillar Ip is pushed and inserted to the column filter 51, and the cold water Iw of 1 to 2° C. is injected into the column filter 51. The injection of the cold water Iw substitutes the concentrated solution Lt in the ice pillar Ip for the cold water Iw to be discharged outside of the column filter 51.

The concentrated solution Lt discharged from the column filter 51 may be utilized directly or may be returned to the material tank 11 to be concentrated again. While, the ice pillar Ip after the substitution is returned to the conveying cylinder 41 of the ice pillar cutting/conveying means 4 by applying pressure to the column filter 51 from the lower part. Then, the ice pillar Ip is conveyed to a reservoir tank 16 adjacent to the column filter 51, while closing the lower end opening of the conveying cylinder 41 by the cutter 42, to be reused as a material of the cold water Iw for substitution or another thermal source for cooling.

CONCENTRATING OPERATION

Described next is concentrating operation of the aforementioned freeze-concentrating apparatus 1, together with a concentrating method.

First, the cooling cylinder 22 is cooled by circulating the coolant between the thermal source unit 21 and the cooling cylinder 22 by driving the ice producing means 2. On the other hand, the aqueous solution Lu in the material tank 11 is supplied to the ice producing means 2 by driving the circulating pump 13. In the inside of the cooling cylinder 22, the aqueous solution Lu is cooled by the coolant and stirred by the stirring member 25 to be in the excessively cooled state.

The aqueous solution Lu in the excessively cooled state flows out to the conveying pipe 14 from the outlet 26 of the cooling cylinder 22. At this time, ice cores are generated in the aqueous solution Lu by an impact energy or the like, thereby being the suspension Ls containing the ice crystals Cp to flow into the ice pillar producing means 3.

The suspension Ls flows into the lower accumulation chamber 3L of the inner cylinder 32 of the ice pillar producing mens 3 to be stirred by the flow thereof, thereby dispersing the ice crystals Cp evenly. Thereafter, the suspension Ls flows into the upper accumulation chamber 3U through the holes 3h of the rectification plate 33. For this reason, the ice crystals Cp are dispersed more evenly by the suspension Ls, and float up above the suspension Ls.

Referring to the suspension Ls in the upper accumulation chamber 3U, the liquid component is separated and discharged to the outer cylinder 31 from the inside of the inner cylinder 32 through the filter 35. Accordingly, the ice crystals Cp are deposited in the upper accumulation chamber 3U and compacted by receiving the pressure of the suspension Ls and the weight of the ice cake Cm thereabove. Thereby, the ice crystals Cp are fused and grown. As a result, the thus solidified ice cake Cm is grown upward.

On the other hand, the liquid component in the suspension Ls discharged to the outer cylinder 31 becomes the aqueous solution Lu after passing through the filter 36. The aqueous solution Lu is returned to the thermal source unit 21 by the circulating pump 13 to be cooled again together with the aqueous solution Lu in the material tank 11.

Moreover, the ice cake Cm in the upper accumulation chamber 3U is grown upward and is introduced into the conveying cylinder 41 of the ice pillar cutting/conveying means 4. Then, the ice cake Cm is cut into the ice pillar Ip of, for example, about 40 cm in length by the cutter 42. The conveying cylinder 41 of the ice pillar cutting/conveying means 4 moves along the slide table 61 with the lower end opening closed by the cutter 42, so that the ice pillar Ip is conveyed to the point above the column filter 51 of the separating means 5. Subsequently, the cutter 42 is moved to open the lower end opening of the conveying cylinder 41, so that the ice pillar Ip falls into the column filter 51.

Thereafter, the upper part of the column filter 51 is sealed by the head part 53 of the separating means 5 after the conveying cylinder 41 of the ice pillar cutting/conveying means 4 is moved. Then, the cold water Iw of 1 to 2° C. is injected, for example, at about 1 kg/cm² into the column filter 51. The injection of the cold water Iw substitutes the concentrated solution Lt in the ice pillar Ip for the cold water Iw to be discharged outside of the column filter 51.

The concentrated solution Lt is used directly or returned to the material tank 11 to be concentrated again. On the other hand, the ice pillar Ip after the substitution is returned to the conveying cylinder 41 of the ice pillar cutting/conveying means 4 from the column filter 51 and is conveyed to the reservoir tank 16 to be reused as a material of the cold water Iw for substitution or another thermal source for cooling. Also, the aqueous solution Lu discharged from the inner cylinder 32 to the outer cylinder 31 of the ice pillar producing means 3 is used as the concentrated solution Lt of a given concentration or returned to the material tank 11 to be concentrated again. Then, the above-described operation is repeated for concentration.

Wherein, only one ice pillar cutting/conveying means 4 is provided in this case, but two or more means 4 may be provided. Also, the conveyance of the ice pillar Ip to the separating means 5 and the like may be carried out continuously by alternatively operating the plural ice pillar cutting/conveying means 4.

Figure 6:
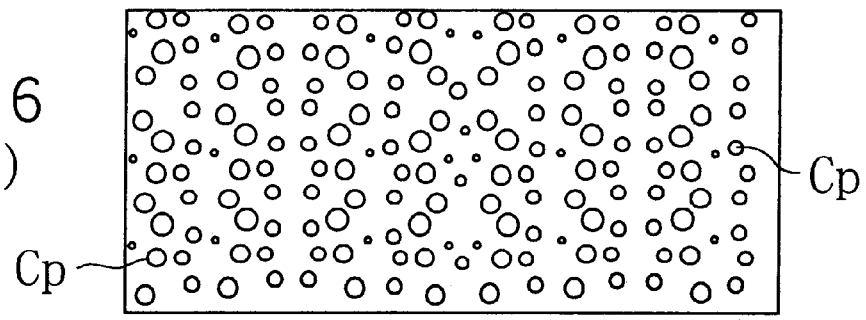
FIG. 6(a) of ice crystals for showing behavior of the ice crystals.
Figure 6:
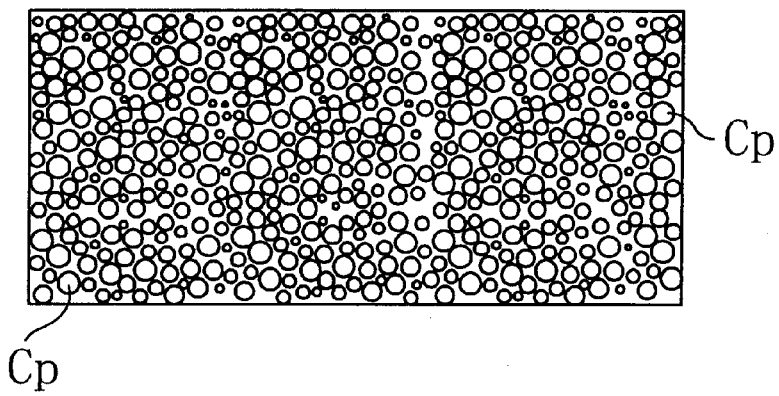
Figure 6:
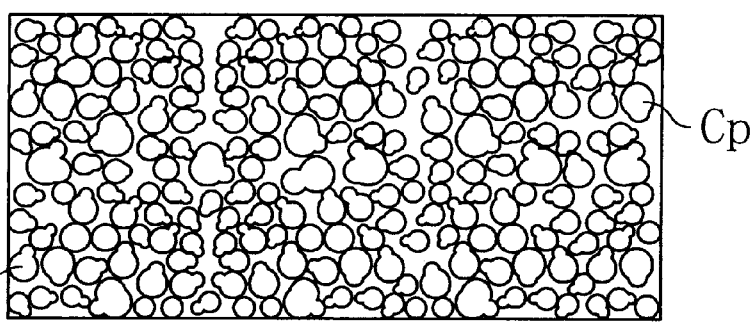
Figure 6:
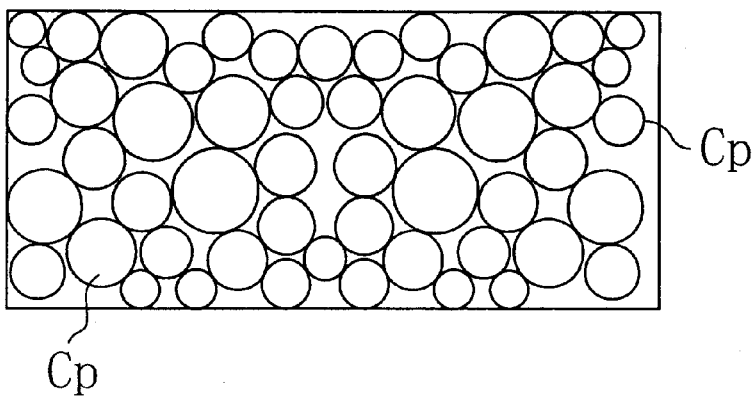

FIG. 6 shows behavior of the ice crystals Cp.

FIG. 6(a) shows the suspension Ls supplied by the ice producing means 2 to the ice pillar producing means 3, wherein the diameter of the ice crystals Cp is 20 to 50 μm and the grain density thereof is 30 to 50%.

FIG. 6(b) shows the ice crystals Cp in the lower accumulation chamber 3L of the ice pillar producing means 3, wherein the diameter of the ice crystals Cp remains unchanged, while the grain density thereof becomes large.

FIG. 6(c) shows the ice crystals Cp in the upper accumulation chamber 3U of the ice pillar producing means 3 to indicate the state that fusing by the pressure starts.

FIG. 6(d) shows the ice pillar Ip (ice cake Cm), wherein the ice crystals Cp are grown to have a diameter of 100 to 150 μm.

Figure 7:
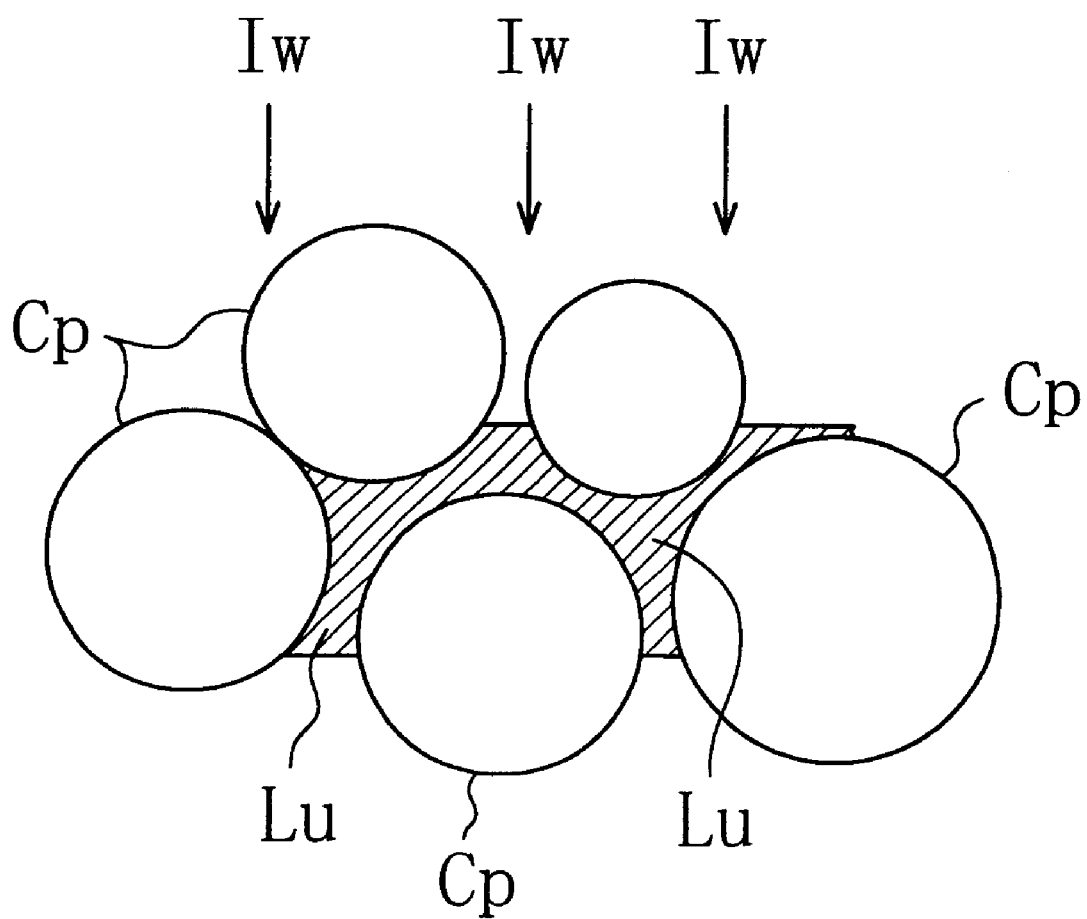
FIG. 7 is an enlarged view showing behavior of an aqueous solution and cold water in a column filter.
Figure 8:
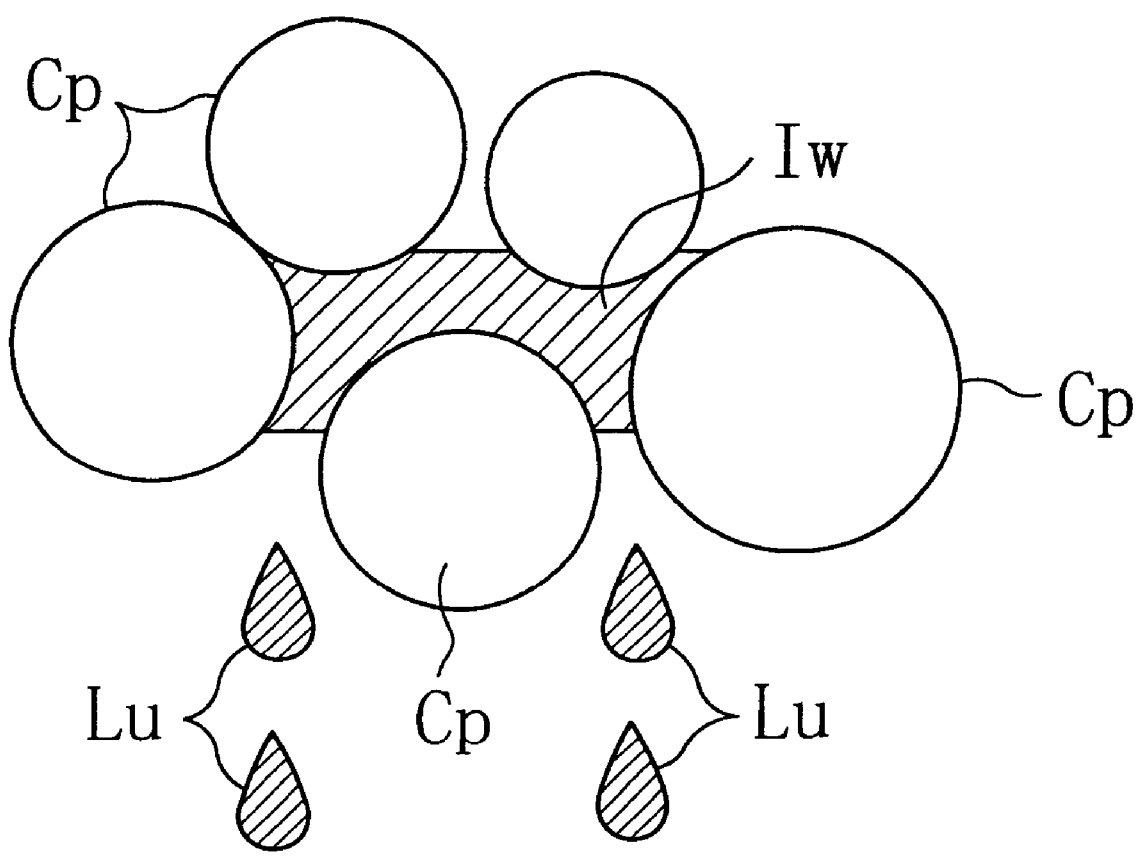
FIG. 8 is an enlarged view showing behavior of the aqueous solution and the cold water in the column filter.

FIGS. 7 and 8 shows behaviors of the aqueous solution Lu and the cold water Iw in the column filter 51 of the separating means 5. When the cold water Iw is introduced into the inside of the ice pillar Ip, the aqueous solution Lu is substituted for the cold water Iw, thereby the aqueous solution Lu is pushed out in the column filter 51 without dilution.

WORKING EXAMPLE 1

In the aforementioned freeze-concentrating apparatus 1, an amount of the cold water Iw that the separating means 5 requires for the substitution is about 40% of the volume of the ice pillar Ip.

About 1 hour operation is conducted using 100-litter grape juice of 15.7% sugar as the aqueous solution Lu, which results in 64-litter concentrated juice of 23.9% sugar. The weight of the ice after the substitution is 34.5 kg, which contains sugar of 0.001 to 0.002% concentration.

WORKING EXAMPLE 2

Further, when seawater of which concentration of sodium chloride is 4.0% is turned into fresh water by the aforementioned freeze-concentrating apparatus 1, an ice of which concentration of sodium chloride is 0.006% (60 ppm) is obtained after the substitution, which can be used as fresh water.

EFFECTS

As described above, in the present embodiment, the suspension Ls produced by the ice producing means 2 is made to contain the ice crystals Cp of high ratio, the ice crystals Cp are grown to produce the column-shaped ice cake Cm, and the concentrated solution Lt is taken out from the ice pillar Ip obtained by cutting the ice cake Cm to a give length. Accordingly, the apparatus can perform continuous operation of freeze concentration and be reduced in size, so that facility investment can be reduced.

Also, even in case with a target liquid different in kind of solute or concentration, adjustment for the target liquid can be easily carried out.

Moreover, the ice crystals Cp in the suspension Ls produced by the ice producing means 2 can be large and spherical by the ice pillar producing means 3. Accordingly, the ice crystals Cp produced regardless of an ice producing method can be used for freeze-concentration, thereby enabling great enhancement of concentration efficiency.

In consequence, the present embodiment is useful in concentration of fruit juice, wine and the like, concentration of pharmaceutical material, turning of seawater into fresh water for shipping and for remote islands, and disposal of industrial waste water.

OTHER EMBODIMENTS

In the above embodiment, the ice producing means 2 produces the suspension Ls in such a manner that the excessively cooled state of the aqueous solution Lu is dispersed by the stirring mechanism 23. However, the ice producing means in the present invention may be provided with a scraping blade mechanism for scraping an ice generated on the surface of the cooling cylinder 22.

Also, the cold water Iw is injected to the separating means 5, while the cold water Iw may be merely infused to the upper end part of the column filter 51 to which the ice pillar Ip is inserted. In this case, a vacuum pump connected with the lower end part of the column filter 51 is driven to apply a negative pressure to the column filter 51 so as to take out the concentrated solution Lt in the ice pillar Ip.

Further, as another embodiment for the separating means 5, a centrifuge having a rotary cylinder may be provided. In detail, in the separating means 5, after the ice cake Cm produced by the ice pillar producing means 3 is clashed adequately by manual operation or the like and the ice cake Cm or thus clashed flakes are accommodated into the rotary cylinder, the concentrated solution Lt in the ice cake Cm or the flakes is centrifugally separated and taken out by rotating the rotary cylinder.

Moreover, the rectification plate 33 is provided in the ice pillar producing means 3, but is not necessarily provided therein in case where the dimension of the accumulation chamber 3R is large, i.e., the accumulation chamber 3R is large in the longitudinal direction.

Furthermore, a pressure may be applied to the suspension Ls in the ice pillar producing means 3 by a separate pressure applying means, or the ice crystals Cp in the suspension Ls may be fused by pressure application and the weight of itself.

Also, the ice pillar cutting/conveying means 4 is provided in the above embodiment, while the ice pillar cutting/conveying means 4 is not necessarily provided in the invention according to claim 1. In short, only required is to convey the ice pillar Ip of a given length from the ice pillar producing means 3 to the column filter 51 of the separating means 5.

In addition, the ice pillar producing means 3 can be used as an independent ice pillar producing apparatus. In this case, the produced ice pillar can be used as food in a sherbet state, for example, with the use of wine. Especially, food having novel taste such as a stuffing in a dumpling can be obtained, instead of frosty food such as conventional food in a sherbet state.

INDUSTRIAL APPLICABILITY

As described above, the freeze-concentrating apparatus for an aqueous solution, the ice pillar producing apparatus and the freeze-concentrating method for an aqueous solution are useful in concentration of beverage, alcohol, a medicament and the like, and suitable for disposal of turning industrial waste water or seawater into fresh water.

What is claimed is:

1. A method of freeze-concentrating an aqueous solution, comprising the steps of:
   continuously producing a suspension containing ice crystals by cooling an aqueous solution by a heat exchanger for cooling of ice producing means;
   then producing a column-shaped ice cake by supplying the suspension produced by the ice producing means to ice pillar producing means, separating and discharging a liquid component from the suspension to increase the ratio of the ice crystals in the suspension, and growing the ice crystals;
   subsequently forming an ice pillar of a given length by cutting the ice cake produced by the ice pillar producing means and conveying and inserting the ice pillar into a column filter of separating means by ice pillar cutting/conveying means;
   then taking out a concentrated solution in the ice crystals of the ice pillar by injecting or infusing cold water into the separating means.

2. A freeze-concentrating apparatus for an aqueous solution, comprising:
   ice producing means, having a heat exchanger for cooling, for continuously producing a suspension containing ice crystals by cooling an aqueous solution by the heat exchanger for cooling;
   ice pillar producing means, to which the suspension produced by the ice producing means is supplied, for separating and discharging a liquid component from the suspension to increase the ratio of the ice crystals in the suspension and for producing a column-shaped ice cake containing the grown ice crystals;
   separating means for taking out a concentrated solution from the ice pillar produced by the ice pillar producing means; and
   ice pillar cutting/conveying means for cutting the ice cake produced by the ice pillar producing means into an ice pillar of a given length and for conveying the ice pillar to the separating means.

3. A freeze-concentrating apparatus for an aqueous solution, comprising:
   ice producing means, having a heat exchanger for cooling, for continuously producing a suspension containing ice crystals by cooling an aqueous solution by the heat exchanger for cooling;
   ice pillar producing means, to which the suspension produced by the ice producing means is supplied, for separating and discharging a liquid component from the suspension to increase the ratio of the ice crystals in the suspension and for producing a column-shaped ice cake containing the grown ice crystals; and
   separating means for taking out a concentrated solution from the ice pillar produced by the ice pillar producing means;
   wherein the ice producing means includes a stirring mechanism for stirring the aqueous solution flowing to a cooling cylinder serving as the heat exchanger for cooling or a scraping blade mechanism for scraping an ice generated on the surface of a cooling cylinder serving as the heat exchanger for cooling.

4. The freeze-concentrating apparatus for an aqueous solution of any one of claims 2 or 3, wherein the separating means includes a centrifuge, having a rotary cylinder for clashing adequately and accommodating the ice cake produced by the ice pillar producing means, for centrifugally separating to take out the concentrated solution in the ice cake by rotating the rotary cylinder.

5. A freeze-concentrating apparatus for an aqueous solution, comprising:
   ice producing means, having a heat exchanger for cooling, for continuously producing a suspension containing ice crystals by cooling an aqueous solution by the heat exchanger for cooling;
   ice pillar producing means, to which the suspension produced by the ice producing means is supplied, for separating and discharging a liquid component from the suspension to increase the ratio of the ice crystals in the suspension and for producing a column-shaped ice cake containing the grown ice crystals; and
   separating means for taking out a concentrated solution from the ice pillar produced by the ice pillar producing means, wherein the separating means includes:
   a column filter to which the ice pillar is inserted; and
   a cold water injecting mechanism, having a head part adhered to and caught by the column filter, for substituting the concentrated solution in the ice pillar for cold water by injecting cold water into the column filter through the head part to take out the concentrated solution.

6. A freeze-concentrating apparatus for an aqueous solution, comprising:
   ice producing means, having a heat exchanger for cooling, for continuously producing a suspension containing ice crystals by cooling an aqueous solution by the heat exchanger for cooling;
   ice pillar producing means, to which the suspension produced by the ice producing means is supplied, for separating and discharging a liquid component from the suspension to increase the ratio of the ice crystals in the suspension and for producing a column-shaped ice cake containing the grown ice crystals; and
   separating means for taking out a concentrated solution from the ice pillar produced by the ice pillar producing means, wherein the separating means includes:
   a column filter to which the ice pillar is inserted; and
   a vacuum pump, connected with the lower part of the column filter, for taking out the concentrated solution in the ice pillar by applying a negative pressure to the column filter.

7. The freeze-concentrating apparatus for an aqueous solution of claims 5 or 6, wherein the ice pillar producing means include a producing cylinder to which the suspension is supplied and a filter, attached to a part of the side wall of the producing cylinder, for separating and discharging the liquid component from the suspension, and
   the producing cylinder has at the inside thereof an accumulation chamber for producing a column-shaped ice cake by accumulating the suspension, fusing the ice crystals in the suspension by at least one of pressure application and the weight of itself, and growing the ice crystals.

8. The freeze-concentrating apparatus for an aqueous solution of claim 7, wherein the producing cylinder includes a rectification plate, in which a plurality of holes are formed, for rectifying the suspension, the accumulation chamber is divided into an upper chamber and a lower chamber by the rectification plate, and producing cylinder.

9. An ice pillar producing apparatus, comprising:

an ice producing means including a stirring mechanism for stirring an aqueous solution flowing to a cooling cylinder serving as a heat exchanger for cooling or a scraping blade mechanism for scraping an ice generated on the surface of a cooling cylinder serving as the heat exchanger for cooling for continuously producing a suspension containing ice crystals by cooling the aqueous solution by the cooling cylinder;

a producing cylinder to which the suspension containing ice crystals is supplied;

a filter, attached to a part of the side wall of the producing cylinder, for separating and discharging a liquid component from the suspension; and an accumulation chamber, provided at inside of the producing cylinder, for producing a column-shaped ice cake by accumulating the suspension, fusing the ice crystals in the suspension by at least one of pressure application and the weight of itself, and growing the ice crystals.

10. The ice pillar producing apparatus of claim 9, wherein the producing cylinder includes a rectification plate, in which a plurality of holes are formed, for rectifying the suspension, the accumulation chamber is divided into an upper chamber and a lower chamber by the rectification plate, and an outer cylinder is provided outside of the producing cylinder for receiving the liquid component discharged from the producing cylinder.

\* \* \* \* \*